Feb. 20, 1962     G. S. NOVEMBER ET AL     3,021,708

FLOWMETER

Filed April 23, 1957

INVENTOR.
GERALD S. NOVEMBER
FRANK SCHUTE

United States Patent Office 3,021,708
Patented Feb. 20, 1962

3,021,708
FLOWMETER
Gerald S. November, Swampscott, Mass., and Frank Schute, Towson, Md., assignors to the United States of America as represented by the United States Atomic Energy Commission
Filed Apr. 23, 1957, Ser. No. 654,627
3 Claims. (Cl. 73—194)

This invention relates to a fluid flowmeter and more particularly to a fluid flowmeter employing a resonant cavity.

It is important in the design and operation of a piping system carrying fluid flow to have an indication of flow rate and variations thereof in particular portions of the system. This invention provides a flowmeter which gives such an indication and utilizes for this purpose a standing wave set up in the liquid or gas moving through a section of the pipe. The standing wave is set up by abrupt changes in the diameter of the pipe while the amplitude of the standing wave produced thereby is a function of the flow rate. In the practice of this invention we use conventional vibration or pressure pickups and detectors which transform a mechanical movement into an electrical signal.

The standing wave so produced is found to be amplitude modulated by a frequency which we designate for convenience the signal frequency. The amplitude of a standing wave represents, as already noted, a particular rate of flow, and variations in the amplitude represent variations in the flow. Such a wave we may consider as consisting of a carrier wave representing a particular rate of flow modulated by deviations which we refer to as the aforementioned signal frequency. If the frequency of the standing wave is considerably greater than the signal frequency the latter will be a sharp indication of variation in flow rate. We have found that a signal frequency of at least as large as 500 cycles per second can be readily detected and measured with this invention. To obtain an indication of the flow rate and variations thereof, the electric voltage wave produced by the resonating cavity is fed into a circuit which abstracts the signal frequency from the carrier wave frequency. An indication of the flow rate and variations thereof is provided by a recorder for the signal frequency. A flowmeter in accordance with this invention provides an indication of the variations of flow rate directly related to the absolute value of the flow rate, i.e., without a zero correction.

Accordingly we include as objects of our invention a new and improved fluid flowmeter;

Another object is to provide a fluid flowmeter for indicating fluid flow rate and high frequency variations thereof;

Still a further object is to provide a fluid flowmeter for indicating variations in the flow rate up to at least 500 cycles per second;

Another object is to provide a fluid flowmeter for indicating fluid flow rate and variations thereof, the meter including a discontinuity as a disturbance creator, a resonant chamber for standing waves generated by the disturbance, a pickup sensitive to the amplitude of the standing wave, and an electronic circuit together with a recorder for providing an indication of the fluid flow rate and variations thereof; and A further object of this invention is to provide a fluid flowmeter for measuring fluid flow rate and variations thereof utilizing a discontinuity as a disturbance generator which incorporates a projection in the fluid adjacent the discontinuity as an auxiliary disturbance generator.

Comprehension of this invention and other objects thereof will be better understood by consideration of the accompanying drawing in which.

Figure 1:
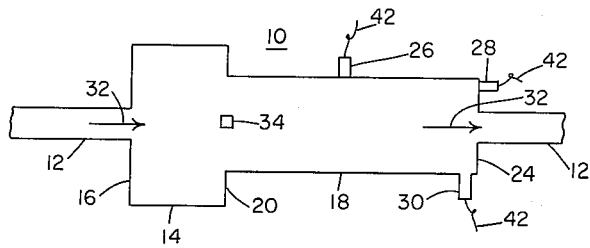
FIG. 1 is a diagrammatic view of a first embodiment of the resonant cavity of this invention.
Figure 2:
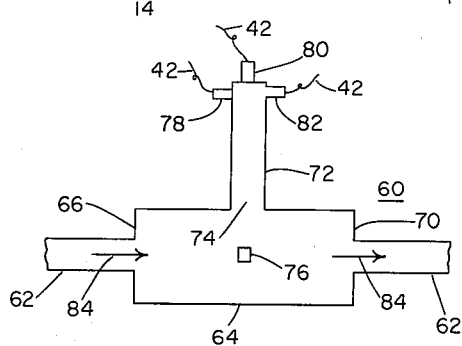
FIG. 2 is a diagrammatic view of a second embodiment of the resonant cavity of this invention.

In FIGS. 1 and 2 are shown two preferred forms which the sensing section of the flowmeter of this invention may take. The embodiments illustrate auxiliary disturbance generators but it is understood that the sensing sections are operable without them and the operation of each section will be described as if the auxiliary disturbance generators are not present.

In FIG. 1 numeral 10 indicates generally the sensing section of the embodiment there shown, as it is inserted into a pipe 12 through which a fluid is flowing in the direction of arrows 32. Pipe 12 opens into a cylindrical expansion chamber 14 so that the passage is enlarged abruptly at a plane 16. At the end of chamber 14 opposite pipe 12, the passage through expansion chamber 14 is contracted abruptly at a plane 20 where there is an opening into a coaxial cylindrical resonant chamber 18. The diameter of chamber 18 is larger than the diameter of pipe 12 and is smaller than the diameter of expansion chamber 14. Resonant chamber 18 is connected at its other end to pipe 12 so that the passage through resonant chamber 18 is abruptly reduced at a plane 24 reentering pipe 12. The entrance port at plane 16 between pipe 12 and expansion chamber 14 is a reflection point for pressure waves present upstream in pipe 12 and thus serves to isolate sensing section 10 therefrom. The exit port at plane 24 is a reflection point for pressure waves downstream from the sensing section and thus serves to isolate the sensing section therefrom. In contact with the outer surface of resonant chamber 18 are placed vibration pickups 26 and 28 located near the midpoint and downstream end thereof respectively as shown. A pressure pickup 30 is placed in contact with the fluid, near the exit port end of resonant chamber 18, as shown. Since the standing wave in the fluid is a pressure oscillation, any pressure pickup in resonant chamber 18 in contact with the fluid detects the amplitude of the standing wave and converts it into the form of an electrical voltage wave as is understood in the art. Since resonant chamber 18 itself vibrates in response to a pressure oscillation in the fluid there within, a vibration pickup in contact with resonant chamber 18 detects the pressure oscillation, also in the form of an electrical voltage wave. The position of the pickups with respect to resonant chamber 18 should preferably be placed where the amplitude of the pressure wave or vibration wave is at its largest. This provides the largest amplitude for the carrier frequency. The suitable positions for the pickups can easily be determined in an experimental manner readily apparent to those skilled in the art. A projection identified as auxiliary disturbance generator 34 may be inserted in the opening between expansion chamber 14 and resonant chamber 18 at plane 20 to increase the disturbance caused by the discontinuity at plane 20 and reinforce the generation of standing waves.

In the operation of the apparatus of FIG. 1, the flowing fluid enters sensing section 10 by way of pipe 12. The discontinuity at plane 20 between expansion chamber 14 and resonant chamber 18 creates a disturbance in the fluid which generates a standing wave in resonant chamber 18. The frequency of the standing wave is determined solely by the geometry of the sensing section 10, while the amplitude of the wave is a function of fluid flow. As already noted, the variations in amplitude of the standing wave are described in terms of the signal frequency.

Figure 3:
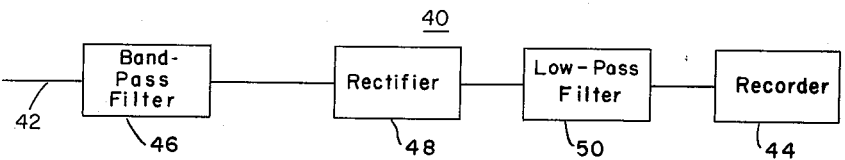
FIG. 3 is a block diagram of an electronic circuit for abstracting the signal from the amplitude-modulated standing wave frequency provided by a pressure wave or by a vibration wave pickup of the sensing section of FIG. 1 or FIG. 2.
Figure 4:
FIG. 4 is a representative portion of a trace on a recorder of variations in a particular flow as provided by the pressure pickup of FIGS. 1 or 2.

The electric voltage wave output of any one of pickups 30, 26 or 28 is fed to the recording section indicated generally by reference numeral 40 in FIG. 3 by way of electric lead 42. Recording circuit 40 includes a band-pass filter 46, a rectifier 48, a low-pass filter 50, and a recorder 44 in series, all of which are of conventional design. The electric voltage wave may include a number of frequencies depending upon the type of fluids being observed and the configuration of resonant chamber 18. As it is preferable in the practice of this invention that a large signal be made available at recorder 44 in response to the flow rate through section 10, band-pass filter 46 is generally designed to pass through the standing wave frequency signal plus and minus the maximum signal frequency expected. The output from band-pass filter 46 is fed into rectifier 48 which transmits to low-pass filter 50 the signal frequency along with the rectified high frequency components from the standing wave frequency. Low-pass filter 50 blocks these higher frequency components and provides the signal voltage for recorder 44. Thus recording section 40 abstracts signal information from the electric voltage wave and this is recorded by recorder 44. Where required, an amplifier of conventional design can be inserted in the circuit between the pickup and recorder 44. FIG. 4 shows a portion of trace on a recorder for an electric voltage wave obtained from a pressure pickup. A similar trace would be produced from a vibration pickup. The traces are merely representative of results which may be obtained from a recorder under certain flow conditions and are not intended to indicate limitations of any kind upon the practice of this invention.

The operation of the device FIG. 1 and the circuitry of FIG. 3 is as follows:

A standing wave is established in resonant chamber 18 as previously described. Detectors 26 and 30 are sensitive to the amplitude of the standing wave produced thereby and produce on lead 42 an electric voltage wave having the standing wave frequency which is amplitude-modulated by the signal frequency. The amplitude of the trace produced by recorder 44 is a direct indication of the fluid flow. If the trace produced is of constant amplitude, then there is no variation in fluid flow. If however, as is more commonly the case, there is a variation in this signal as indicated for example, in the trace shown in FIG. 4, it will be seen that the standing wave fluctuates in amplitude and the variations about some imaginary horizontal line (not shown) indicate the deviations of the fluid flow about the average value represented thereby. Thus the information received by recorder 44 provides a measure of both the flow rate and the changes thereof. As already noted, in the event there are no changes in the flow rate, recorder 44 receives a direct voltage the magnitude of which indicates the flow rate; and when changes in the flow rate are present, recorder 44 receives a fluctuating voltage as illustrated in FIG. 4 indicative of the changes in the flow rate above and below the normal flow rate. Thus it may be considered that the wave form in FIG. 4 consists of a D.C. component representative of the normal flow and of an alternating component representative of the deviations from this normal rate. These deviations may occur at a high frequency, i.e., up to 500 cycles per second. The use of resonant cavity 18 to establish the standing wave permits the relatively high frequency variations in fluid flow to be detected.

A sensing section of a second preferred embodiment of our flowmeter is shown in FIGURE 2 and is indicated generally by numeral 60. The fluid in this embodiment is flowing through a pipe 62 in the direction of the arrows 84, and the sensing section 60 is inserted in the pipe. At a plane 66, pipe 62 enters an expansion chamber 64, so that the diameter of the passage is abruptly increased at plane 66. At the opposite end of chamber 64, at a plane 70, the diameter of chamber 64 is abruptly decreased where it joins the continuation of pipe 62. At a centrally located port 74 in expansion chamber 64, a resonant chamber 72 opens into chamber 64. The longitudinal axis of resonant chamber 72 is radial, and its outer end is closed. Port 74 is a discontinuity in the enlarged section 64 and serves as a disturbance generator for the standing wave in the resonant chamber 72. We often increase the disturbance by using auxiliary disturbance generator 76. It is a projection inserted in the fluid approximately at the intersection of the longitudinal axes of resonant chamber 74 and expansion chamber 64. Vibration pickups 78 and 80 are placed as shown on the surface of resonant chamber 72 near and at its end outermost from expansion chamber 64. A pressure pickup 82 is placed near the same end as shown. The amplitude of the pressure oscillations in the fluid or vibrations in the resonant chamber 72 can be increased for a given flow by making the natural mechanical frequency of the resonant chamber 72 the same as the fundamental or harmonic frequency of the standing wave to be monitored. The abrupt changes in diameter of the fluid conduit at planes 66 and 70 between pipe 62 and expansion chamber 64 serve, as described with respect to FIGURE 1, to isolate the resonant chamber 72 from pressure oscillations present in pipe 62. The operation of the arrangement of FIG. 2 is similar to the operation of the arrangement described in connection with FIG. 1.

Although the preferred embodiments in accordance with our invention which we have described above, include cylindrical expansion chambers and cylindrical resonant chambers, for the practice of our invention the chambers may take a wide variety of shapes. Broadly speaking, our invention requires that the cross-sectional area of a pipe be abruptly changed to provide a discontinuity to cause a disturbance in the fluid flow in a sensing section and a resonant chamber for standing waves be provided open to the fluid to receive and amplify the effect of the disturbance.

While the salient features of the present invention have been described in detail with respect to two embodiments, it will, of course, be apparent that numerous modifications may be made within the spirit and scope of the invention and it is therefore not desired to limit the invention to the exact details shown except insofar as they may be defined in the following claims.

We claim:

1. A flowmeter for indicating fluid flow rate and fast changes thereof which comprises, in combination: an entrance pipe and an exit pipe for said fluid flow; means between said pipes for establishing a standing wave having an amplitude which is a function of said fluid flow rate, said means consisting of a sensing section having a cylindrical expansion chamber and a cylindrical resonant chamber, said expansion chamber having a discontinuity to create a disturbance in said fluid, whereby said disturbance generates said standing wave in said resonant chamber; a detector sensitive to said standing wave on said resonant chamber to yield an electric voltage wave amplitude-modulated by a signal frequency reflecting variations in said flow rate, said wave thereby containing information concerning said flow rate and said fast changes thereof; a recording section, said recording section connected to receive said electric voltage wave and including an electric circuit to separate said signal frequency from said wave, said electric circuit having a band-pass filter and demodulation means in series, said demodulation means including a rectifier and a low-pass filter, and a recorder for indicating said flow rate and said fast changes thereof.

2. A flowmeter for indicating fluid flow rate and fast changes thereof which comprises, in combination: an entrance pipe and an exit pipe for said fluid flow; a sensing section between said pipes having a cylindrical expansion chamber and a cylindrical resonant chamber, said expansion chamber having a discontinuity to create a disturbance in said fluid, whereby said disturbance generates a standing wave in said resonant chamber having an amplitude which is a function of said fluid flow rate; the longitudinal axis of said resonant chamber being parallel to the direction of flow of said fluid through said expansion chamber; a detector sensitive to said standing wave on said resonant chamber to yield an electric voltage wave amplitude-modulated by a signal frequency reflecting variations in said flow rate, said wave thereby containing information concerning said flow rate and said fast changes thereof; a recording section, said recording section connected to receive said electric voltage wave and including an electric circuit to separate said signal frequency from said wave, said electric circuit having a band-pass filter and demodulation means in series, said demodulation means including a rectifier and a low-pass filter, and a recorder for indicating said flow rate and said fast changes thereof.

3. A flowmeter for indicating fluid flow rate and fast changes thereof which comprises, in combination: an entrance pipe and an exit pipe for said fluid flow; a sensing section between said pipes having a cylindrical expansion chamber and a cylindrical resonant chamber, said expansion chamber having a discontinuity to create a disturbance in said fluid, whereby said disturbance generates a standing wave in said resonant chamber having an amplitude which is a function of said fluid flow rate, the longitudinal axis of said resonant chamber being perpendicular to the direction of flow of said fluid through said expansion chamber; a detector sensitive to said standing wave on said resonant chamber to yield an electric voltage wave amplitude-modulated by a signal frequency reflecting variations in said flow rate, said wave thereby containing information concerning said flow rate and said fast changes thereof; a recording section, said recording section connected to receive said electric voltage wave and including an electric circuit to separate said signal frequency from said wave, said electric circuit having a band-pass filter and demodulation means in series, said demodulation means including a rectifier and a low-pass filter, and a recorder for indicating said flow rate and said fast changes thereof.

References Cited in the file of this patent

UNITED STATES PATENTS

| | | |
|---|---|---|
| 1,935,445 | Heinz | Nov. 14, 1933 |
| 2,492,371 | Sivian | Dec. 27, 1949 |
| 2,519,015 | Bensen | Aug. 15, 1950 |
| 2,794,341 | Vonnegut | June 4, 1957 |

OTHER REFERENCES

Pages 185–6, "A Textbook of Sound" by A. T. Wood, published by MacMillan Co. New York in 1955. (QC 225 W6 1955.)

Pages 280–1 "The Dynamical Theory of Sound" by Horace Lamb, published by Edward Arnold & Co. London in 1925. (QC 223. L2 1925.)